United States Patent Office 2,809,174
Patented Oct. 8, 1957

2,809,174

MANUFACTURE OF FOAMED LATEX SPONGE REINFORCED WITH GLASS FIBERS

Paul Dereniuk, Woonsocket, R. I., assignor to United States Rubber Company, New York, N. Y., a corporation of New Jersey No Drawing. Application October 26, 1953,
Serial No. 388,429

6 Claims. (Cl. 260—2.5)

This invention relates to the manufacture of foamed latex sponge reinforced with glass fibers.

It is well known that sponge rubber articles may be made by forming a natural or synthetic rubber latex froth or foam containing compounding materials such as foaming agents, vulcanizing ingredients, accelerators, stabilizers, fillers, gelling agents, and the like, shaping the foam as by pouring it into molds, allowing the foam to gel by permitting it to rest at room temperature or accelerating the rate of gelling by heat, and vulcanizing at elevated temperature. It is known that the incorporation of glass fibers in the sponge improves its compression resistance. As shown in U. S. Patent 2,498,785, the dry glass fibers are sifted into the latex gradually during the whipping operation. The continuation of the whipping operation is necessary to uniformly distribute the glass fibers throughout the foam structure. In commercial sponge production, it is not feasible to take the time and to provide the necessary extra equipment to add compounding ingredients or glass fibers to the latex in the beater while the latex is being frothed. Further, such addition of the fibers during frothing limits the operation to a batch process in commercial whippers. In commercial batch and continuous foam processes, the compounding ingredients are added to the latex before or after the frothing operation as aqueous solutions in the case of water-soluble compounding ingredients, or in the case of water-insoluble compounding ingredients, as aqueous dispersions or pastes usually with the aid of anionic surface-active agents. Such anionic surface-active agents are compatible with the anionic surface-active agents that are present in the latex. Generally, stabilizers, vulcanizing ingredients, and foaming agents are compounded into the latex in a mixing apparatus before whipping to a foam, and gelling and agents are mixed into the completely whipped foam in a so-called sensitizing apparatus prior to pouring into molds or otherwise shaping the foam. When glass fibers were slurried in water, or in water containing anionic surface-active agents similarly to conventional compounding ingredients, for addition to the latex, the glass fibers agglomerated into small lumps or nodules. When such fiber slurries containing these agglomerates were mixed with the latex before foaming as in conventional latex compounding practice, the nodules would not break up and the fibers would not disperse in the latex. When whipped into a foam in the various types of commercial frothing machines, the fibers did not become dispersed in the latex but instead the fiber agglomerates settled out very rapidly, and a uniform sponge could not be made in this manner. Similarly, such a glass fiber slurry containing the agglomerates when mixed with the whipped froth give a non-uniform sponge containing the glass fiber nodules. According to the invention of my prior application Serial No. 350,255, filed April 21, 1953, I have found that if the glass fibers are slurried in water with a cationic surface-active agent, a uniform dispersion of discrete glass fibers results and this slurry may readily be mixed with liquid latex before foaming, or with the frothed latex, to give a final sponge rubber product in which the individual glass fibers are uniformly dispersed without agglomeration or nodulation.

According to the present invention, I have found that still further advantages are obtained if the slurry of glass fibers in water containing a cationic surface-active agent is prepared as a three phase system of water, solids and air having a wet density of 0.2 to 0.8 gram per cubic centimeter (gm. per cc.) before being mixed with the latex or the foam. I have further found that it is possible to utilize a slurry of glass fibers in water containing a non-ionic surface-active agent if it is similarly prepared as a three phase system of water, solids and air having a wet density of 0.2 to 0.8 gm. per cc. for mixing with the latex or with the foam.

A particular advantage of the present invention is that the three phase system of water, solids and air in the case of glass fibers is more fluid than the two phase system of water and fibers, and that the fluidity increases as the density of the aerated slurry decreases. This is opposite to the case of the latex itself where the aeration or foaming of the latex decreases its fluidity considerably. This surprising increase in the fluidity of the fiber slurry with decreasing density greatly facilitates preparation of the fiber slurry and decreases the power necessary to mix the fibers with the water with the incorporation of increasing amounts of air. With high solids fiber content in the absence of air, pumping of the fiber slurry may not be practical since it acts more like a wet solid, whereas on inclusion of air such slurries become fluent. Thus a second advantage is the ease of pumping and metering the fiber slurry containing air when mixing it with the latex or the foam. A third distinct advantage appears particularly when the aerated fiber slurry is mixed with the latex foam in that it is easier to mix the lower density fiber slurry with the low density latex foam since the higher density slurry may have a tendency to drop down through the latex foam to the bottom of the mixing apparatus and make uniform mixing difficult.

In carrying out the present invention, the glass fibers are slurried in water with a cationic surface-active agent or a non-ionic surface-active agent or a mixture of the same in the form of a three phase system of water, solids and air having a wet density of 0.2 to 0.8 gm. per cc. Such an aerated slurry of glass fibers may be prepared by mixing the fibers in water containing the surface-active agent or mixing the fibers having the surface-active agent on their surface in water in a mixing device so that a vortex is formed which draws air into the fluid until the desired wet density from 0.2 to 0.8 gm. per cc., preferably from 0.4 to 0.6 gm. per cc., is obtained. If desired, air may be blown into the fibers and water and surface-active agent in the mixing device. The aerated slurry of glass fibers is mixed with the latex containing a conventional soap (alkali salt of a soap-forming monocarboxylic acid) or other anionic surface-active foaming agent before or after whipping the latex into a foam. Conventionally, the wet density of latex foam is generally 0.05 to 0.4 gm. per cc. In the present invention, the wet density of the latex foam containing the slurry of glass fibers may be in the same range of 0.05 to 0.4 gm. per cc. Although conventional commercial sponge production is not presently equipped to add compounding ingredients during frothing of the latex, the frothing apparatus may be adopted, if desired, to permit the introduction during latex frothing of the aerated aqueous slurry of glass fibers according to the present invention. After the latex which may or may not contain the glass fibers has been whipped into a foam of the desired density, a gelling agent such as 0.5 to 4 parts of sodium silicofluoride per 100 parts of rubber of the latex is conventionally mixed into the foam. When the aerated slurry of glass fibers is mixed into the preformed latex froth, which is the present preferred embodiment of the invention, the slurry of glass fibers is mixed into the latex foam concurrently with the gelling agent. The latex foam containing the glass fibers and gelling agent is shaped as by pouring in molds, the foam permitted to gel, and the gelled foam vulcanized to sponge rubber.

The latex for preparing sponge rubber according to the present invention may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes-1,3, for example, butadiene-1,3, 2-methyl-butadiene-1,3 (isoprene), 2-chloro-butadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The latex as prepared for foaming will contain 0.5 to 10 parts, and preferably 1 to 6 parts, based on 100 parts of rubber of the latex, of soap or other anionic surface-active agent, which may be added as such in the case of natural rubber latex, or which may include anionic surface-active agents from dispersions of added conventional compounding ingredients, or which may at least in part be the residual emulsifying agent from the emulsion polymerization in the case of a synthetic latex. Such soaps, or other anionic surface-active agents, are those having a general formula selected from the group consisting of R—COOM, R—SO$_3$M, and R—OSO$_3$M, where M represents alkali-metal, ammonium or substituted ammonium (amine) radical, and R represents an organic radical containing at least one group having more than 8 (to 24) carbon atoms. Examples of such anionic surface-active agents are:

(1) Soaps (e. g. sodium laurate, ammonium stearate, diethanol-ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g. $C_{17}H_{33}$—O—$C_2H_4$—SO$_3$—Na).

(5) Sulfated ethers of long and short chain aliphatic groups (e. g. $C_{17}H_{33}$—O—$C_2H_4$—O—SO$_3$Na).

(6) Sulfonated alkyl esters of long chain fatty acids (e. g. $C_{17}H_{33}$—$\overset{O}{\overset{\|}{C}}$—O—$C_2H_4$—SO$_3$Na)

(7) Sulfonated glycol esters of long chain fatty acids (e. g. $C_{17}H_{33}$—$\overset{O}{\overset{\|}{C}}$—O—$C_2H_4$—O—SO$_3$Na)

(8) Sulfonated alkyl substituted amids of long chain fatty acids

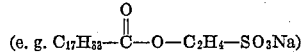
(e. g. $C_{17}H_{33}$—$\overset{O}{\overset{\|}{C}}$—NH—$C_2H_4$—SO$_3$Na

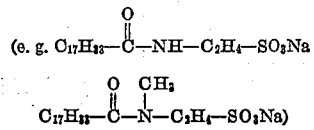
$C_{17}H_{33}$—$\overset{O}{\overset{\|}{C}}$—$\overset{CH_3}{\overset{|}{N}}$—$C_2H_4$—SO$_3$Na)

(9) Alkylated aryl sulfonates (e. g. isopropyl naphthalene sodium sulfonate, dodecyl benzene sodium sulfonate).

(10) Hydroaromatic sulfonates (e. g. tetrahydronaphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate

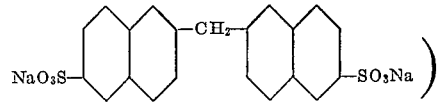

The glass fibers, which may be used, are commercially available and are made from Pyrex type sodium-boron glass, drawn to a diameter in the range of 0.0002 to 0.0007 inch and hammer-milled to various lengths from 1/32 inch to 1/2 inch. The preferred fibers are about 0.00038 inch average diameter and about 1/8 inch average length. According to the present invention, the glass fibers are slurried in water with 0.2 to 10 parts of cationic surface-active agent or non-ionic surface-active agent or mixture thereof per 100 parts of the glass fibers with the incorporation of air to give a three phase system of water and solids (glass) and air having a wet density of 0.2 to 0.8 gram per cubic centimeter. The concentration of glass fibers will generally be from 20% to 60% of the weight of the fiber slurry. The amount of glass fibers used may be from 1 to 20 parts, and is preferably 2 to 6 parts, based on 100 parts of rubber of the latex. The latex contains an amount of anionic surface-active agent in excess of the cationic surface-active agent (where a cationic surface-active agent is used to prepare the aerated slurry of glass fibers) which neutralizes the cationic surface-active agent. The non-ionic surface-active agent when used is of course compatible with the anionic surface-active agent in the latex. After the slurry of glass fibers is incorporated in the latex, there results an anionic dispersion in which the glass fibers are uniformly and completely dispersed in the latex. This is surprising when one considers that in mixing anionic latices with aqueous slurries of the glass fibers without any surface-active agent and glass fiber slurries containing anionic surface-active agent, the glass fibers agglomerated and the agglomerates were retained to the finished sponge to give a non-uniform product.

Conventional cationic and non-ionic surface-active agents may be used for preparing the slurry of glass fibers.

Examples of cationic surface-active agents that may be used for preparing the slurry of glass fibers are:

(1) Quaternary ammonium salts in which one of the radicals attached to the nitrogen has an organic group having at least 8 (to 24) carbon atoms (e. g. trimethyl octadecyl ammonium chloride, dimethyl hexadecyl octadecyl ammonium chloride, lauryl pyridinium chloride, cetyl dimethyl benzyl ammonium chloride, N-stearyl betaine).

(2) Amines, amides and diamines having an organic group containing at least 8 (to 24) carbon atoms and their acid salts (e. g. octadecylamine acetate, hexadecyl di-(polyoxyethylene) amine, oleyl diethylethylenediamine).

Examples of non-ionic surface-active agents that may be used for preparing the slurry of glass fibers are:

(1) Monoethers of polyglycols with long chain fatty alcohols, such as reaction products of ethylene oxide or polyethylene glycol with a long-chain fatty alcohol (e. g. reaction product of ethylene oxide and oleyl alcohol, viz: $C_{18}H_{35}$—$(OC_2H_4)_nOH$, where $n$ is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

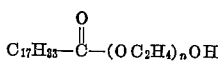

where $n$ is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

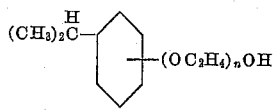

where $n$ is 10 to 20).

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

The following illustrates the invention. All parts and percentages referred to in this patent specification are by weight.

*Example I*

A natural rubber latex and synthetic rubber latex blend was made by mixing 120 parts of natural latex containing 80 parts of rubber with 33.3 parts of a GR-S (butadiene-styrene copolymer) latex containing 20 parts of rubber. This was compounded by mixing into the latex blend the following: 1.25 parts of potassium oleate soap as a 20 percent aqueous solution, 0.35 part of potassium ricinoleate soap as a 35 percent aqueous solution, 0.75 parts of antioxidant as a 60 percent aqueous emulsion, 0.75 parts of zinc diethyl diethiocarbamate as a 50 percent aqueous dispersion, 2 parts of sulfur as a 60 percent aqueous dispersion, 1.25 parts of the zinc salt of mercaptobenzothiazole as a 40 percent aqueous dispersion, 5 parts of zinc oxide as a 40 percent aqueous dispersion and 1 part of triethyl trimethyl trimene as a 50 percent aqueous solution. The compounded latex was passed through a conventional beater where the latex was whipped into a foam of a wet density of approximately 0.115 gm. per cc. An aqueous slurry of glass fibers of about ⅛ inch average length and about 0.00038 in average diameter was prepared by stirring in 109 parts of sifted glass fibers into 190 parts of water containing 2 parts of the acetate salt of a mixture of long chain aliphatic (6% hexadecyl, 93% octadecyl and 1% octadecenyl) amines which is a cationic surface-active agent and containing 2 parts of polyethylene glycol monoisooctyl phenyl ether (reaction product of ethylene oxide and isooctyl phenol) which is a non-ionic surface-active agent. The stirring was done so that a vortex was formed which drew air into the slurry and this was continued until the wet density of the slurry was approximately 0.4 gm. per cc. Ten parts of this glass fiber slurry was homogeneously mixed with the prefoamed latex above, after which there was added 2 parts on a dry weight basis of a 25 percent aqueous paste of sodium silico-fluoride gelling agent. The foam was poured into molds, permitted to gel at room temperature and then vulcanized at 212° F. The product was a uniform sponge rubber free from agglomerates of the glass fibers.

In a variation of the above method, the same aerated aqueous slurry of glass fibers is added to the latex with the other compounding ingredients as above to give a latex uniformly compounded with the glass fibers free from lumps or nodules of glass fiber agglomerates. The latex containing the glass fibers is then whipped into a foam of the desired density after which the gelling agent as above is mixed into the foam; the foam is shaped as by pouring in molds; the shaped foam is permitted to gel; and the gelled foam is vulcanized to sponge rubber.

*Example II*

The latex blend of Example I containing 80 parts of natural rubber and 20 parts of GR-S rubber was compounded as in Example I and whipped into a foam of a wet density of approximately 0.115 gm. per cc. An aqueous slurry of glass fibers of about ⅛ inch average length and about .00038 in average diameter was prepared by stirring in 93 parts of sifted glass fibers into 182 parts of water containing 10 parts of polyethylene glycol monoisooctyl phenyl ether (reaction product of ethylene oxide and isooctyl phenol) which is a non-ionic surface-active agent. The stirring was done so that a vortex was formed which drew air into the slurry and this was continued until the wet density of the slurry was approximately 0.4 gm. per cc. Ten parts of this glass fiber slurry was homogeneously mixed with the prefoamed latex, after which there was added 2 parts on a dry weight basis of a 25 percent aqueous paste of sodium silicofluoride gelling agent. The foam was poured into molds, permitted to gel at room temperature and then vulcanized at 212° F. The product was a uniform sponge rubber free from agglomerates of the glass fibers.

*Example III*

The latex blend of Example I containing 80 parts of natural rubber and 20 parts of GR-S rubber was compounded as in Example I and whipped into a foam of a wet density of 0.115 gm. per cc. An aqueous slurry of glass fibers of about ⅛ inch average length and about .00038 in average diameter was prepared by stirring in 58 parts of sifted glass fibers into 140 parts of water containing 1 part alkyl (90% dodecyl, 9% tetradecyl and 1% octadecyl) trimethyl ammonium chloride which is a quaternary cationic surface-active agent. The stirring was done so that a vortex was formed which drew air into the slurry and this was continued until the wet density of the slurry was approximately 0.2 to 0.3 gm. per cc. Ten and one half parts of this glass fiber slurry was homogeneously mixed with the prefoamed latex, after which there was added 2 parts on a dry weight basis of a 25 percent aqueous paste of sodium silicofluoride gelling agent. The foam was poured into molds, permitted to gel at room temperature and vulcanized at 212° F. The product was a uniform sponge rubber free from agglomerates of the glass fibers.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making foamed latex sponge which comprises forming into a foam a rubber latex containing 0.5 to 10 parts of anionic surface-active agent per 100 parts of rubber of the latex and an aerated aqueous slurry of uniformly dispersed discrete glass fibers having a length from 1/32 inch to ½ inch, said slurry containing 0.2 to 10 parts of material selected from the group consisting of cationic and non-ionic surface-active agents per 100 parts of glass fibers, said aqueous slurry being a three phase system of water and solids and air having a wet density of 0.2 to 0.8 gram per cubic centimeter, the amount of glass fibers being 1 to 20 parts per 100 parts of rubber of the latex, the amount of anionic surface-active agent in the latex being in excess of any cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO₃M, and R—OSO₃M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

2. The method of making foamed latex sponge which comprises whipping into a foam a mixture comprising a rubber latex containing 0.5 to 10 parts of anionic surface-active agent per 100 parts of rubber of the latex and an aerated aqueous slurry of uniformly dispersed discrete glass fibers having a length from 1/32 inch to 1/2 inch, said slurry containing 0.2 to 10 parts of material selected from the group consisting of cationic and non-ionic surface-active agents per 100 parts of glass fibers, said aqueous slurry being a three phase system of water and solids and air having a wet density of 0.2 to 0.8 gram per cubic centimeter, the amount of glass fibers being 1 to 20 parts per 100 parts of rubber of the latex, the amount of anionic surface-active agent in the latex being in excess of any cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO₃M, and R—OSO₃M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

3. The method of making foamed latex sponge which comprises whipping to a foam a rubber latex containing 0.5 to 10 parts of anionic surface-active agent per 100 parts of rubber of the latex, mixing with the foamed latex an aerated aqueous slurry of a wet density of 0.2 to 0.8 gram per cubic centimeter of uniformly dispersed discrete glass fibers having a length from 1/32 inch to 1/2 inch, said slurry containing 0.2 to 10 parts of material selected from the group consisting of cationic and non-ionic surface-active agents per 100 parts of glass fibers, the amount of said glass fibers being 1 to 20 parts per 100 parts of rubber of the latex, the amount of anionic surface-active agent in the latex being in excess of any cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO₃M, and R—OSO₃M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group contining at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

4. The method of making foamed latex sponge which comprises whipping to a foam a rubber latex containing 0.5 to 10 parts of anionic surface-active agent per 100 parts of rubber of the latex, mixing with the foamed latex an aerated aqueous slurry of a wet density of 0.2 to 0.8 gram per cubic centimeter of uniformly dispersed discrete glass fibers having a length from 1/32 inch to 1/2 inch, said slurry containing 0.2 to 10 parts of cationic surface-active agent per 100 parts of glass fibers, the amount of said glass fibers being 1 to 20 parts per 100 parts of rubber of the latex, the amount of anionic surface-active agent in the latex being in excess of the cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO₃M, and R—OSO₃M, where M represents a radical selected from the group consisting of alkali-metal, ammonium and amine radicals, and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

5. The method of compounding a rubber latex containing 0.5 to 10 parts of anionic surface-active agent per 100 parts of rubber of the latex with glass fibers which comprises mixing in the latex an aerated aqueous slurry of uniformly dispersed discrete glass fibers having a length from 1/32 inch to 1/2 inch, said slurry containing 0.2 to 10 parts of material selected from the group consisting of cationic and non-ionic surface-active agent per 100 parts of glass fibers, the amount of anionic surface-active agent in the latex being in excess of any cationic surface-active agent in the glass fiber slurry whereby there results an anionic dispersion after incorporation of the slurry of glass fibers, said aqueous slurry of glass fibers having a wet density of 0.2 to 0.8 gram per cubic centimeter, the amount of glass fibers being 1 to 20 parts per 100 parts of rubber of the latex, said anionic surface-active agent having a general formula selected from the group consisting of R—COOM, R—SO₃M, and R—OSO₃M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

6. The method of compounding a rubber latex containing 0.5 to 10 parts of anionic surface-active agent per 100 parts of rubber of the latex with glass fibers which comprises mixing in the latex an aerated aqueous slurry of uniformly dispersed discrete glass fibers having a length from 1/32 inch to 1/2 inch, said slurry containing 0.2 to 10 parts of cationic surface-active agent per 100 parts of glass fibers, the amount of anionic surface-active agent in the latex being in excess of the cationic surface-active agent in the glass fiber slurry whereby there results an anionic dispersion after incorporation of the slurry of glass fibers, said aqueous slurry of glass fibers having a wet density of 0.2 to 0.8 gram per cubic centimeter, the amount of glass fibers being 1 to 20 parts per 100 parts of rubber of the latex, said anionic surface-active agent having a general formula selected from the group consisting of $R-COOM$, $R-SO_3M$, and $R-OSO_3M$, where M represents a radical selected from the group consisting of alkali-metal, ammonium and amine radicals, and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

References Cited in the file of this patent

UNITED STATES PATENTS

| | | |
|---|---|---|
| 2,382,561 | Gregory | Aug. 14, 1945 |
| 2,432,971 | Ruthman et al. | Dec. 16, 1947 |
| 2,451,446 | Parsons | Oct. 12, 1948 |
| 2,498,785 | Bennett et al. | Feb. 28, 1950 |
| 2,542,364 | Schenker et al. | Feb. 20, 1951 |
| 2,650,184 | Biefeld | Aug. 25, 1953 |

FOREIGN PATENTS

| | | |
|---|---|---|
| 500,340 | Canada | Mar. 2, 1954 |

OTHER REFERENCES

Bennett: Concise Chemical and Technical Dictionary. Copyright 1947; page 275.